United States Patent
Bachnak

(10) Patent No.: US 6,604,727 B1
(45) Date of Patent: Aug. 12, 2003

(54) CONTROL VALVE

(75) Inventor: Nouhad Bachnak, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/629,340

(22) Filed: Aug. 1, 2000

(30) Foreign Application Priority Data

Aug. 4, 1999 (DE) .......................... 199 36 657

(51) Int. Cl.⁷ .................. F16K 39/00; F16K 1/00; F16K 15/00
(52) U.S. Cl. .............. 251/282; 251/321; 251/331
(58) Field of Search ................. 251/282, 321, 251/322, 331, 335.2, 335.3

(56) References Cited

U.S. PATENT DOCUMENTS

| | | | |
|---|---|---|---|
| 907,771 A | * 12/1908 | Fulton | |
| 3,561,482 A | * 2/1971 | Taplin | 137/625.4 |
| 4,020,861 A | * 5/1977 | Shihabi | 137/100 |
| 5,217,043 A | * 6/1993 | Novakovic | 137/460 |
| 5,255,659 A | 10/1993 | Choma | |
| 6,182,684 B1 | * 2/2001 | Frankenberg | 137/340 |

FOREIGN PATENT DOCUMENTS

| | | |
|---|---|---|
| DE | 3228043 | 2/1983 |
| DE | 4226754 | 3/1993 |
| DE | 4404334 | 8/1995 |
| DE | 19518716 | 11/1996 |
| DE | 19721993 | 12/1998 |

\* cited by examiner

Primary Examiner—Kevin Shaver
Assistant Examiner—David A Bonderer
(74) Attorney, Agent, or Firm—Martin A. Farber

(57) ABSTRACT

A pressure compensating element (8) for a control valve (3) for controlling an overflow of a medium from a first pressure space (1) into a second pressure space (2) has a diaphragm (9) separating the pressure space (1, 2) from one another. The pressure compensating element (8) compensates forces acting on a valve body (5) of the control valve (3) and generated by pressure differences in the pressure spaces (1, 2). However, an overflow of a medium from one pressure space (1) into the other pressure space (2) takes place solely in the region of the control valve (3).

7 Claims, 2 Drawing Sheets

CONTROL VALVE

FIELD AND BACKGROUND OF THE INVENTION

The invention relates to a control valve for controlling an overflow of a medium from a first pressure space into a second pressure space having a pressure different from a pressure in the first pressure space, with a valve body prestressed against a valve seat, with a control device for moving the valve body and with a movable pressure compensating element which is subjected to the pressure difference between the pressure spaces and is connected to the valve body and which is intended for compensating the pressure forces acting on the valve body.

Such electromagnetic control valves are used, for example, in devices for exhaust-gas recirculation in internal combustion engines of present-day motor vehicles. In this case, the pressure spaces take the forms of the intake duct and the exhaust duct of the internal combustion engine. In such devices for exhaust-gas recirculation, a part stream of exhaust gas is branched off from the exhaust duct and is supplied to the intake duct. The nitrogen fraction in the exhaust gas can thereby be reduced. The ratio of the exhaust-gas quantity to be supplied to the fresh-air quantity depends on, for example, the load state, the temperatures or the rotational speed of the internal combustion engine and is determined by the control of the valve body. For this control, the control device has, for example, a pneumatic, electromagnetic or electromotive actuating drive.

In order to avoid particularly high actuating forces during the movement of the valve body when there are high pressure differences between the pressure spaces, a control valve has become known from practice, in which a second valve body is designed as a pressure compensating element. The valve bodies are fastened on a common valve shaft and, in the basic position, in each case bear on a valve seat. One of the pressure spaces is connected to the region between the valve bodies, whilst the regions on those sides of the valve bodies which face away from one another are connected to the other pressure space. As a result, forces generated due to pressure differences in the pressure spaces act in each case on the valve shaft, but in opposite directions of force.

A disadvantage of the known control valve is that the respective distances between the valve bodies and the valve seats must have particularly low tolerances. Moreover, for example, in the event of thermal expansion of the valve shaft or wear of the valve bodies and of the valve seats, the control valve does not reliably seal off the pressure spaces from one another. Different expansions of the valve bodies and the valve seats likewise result in leaks.

SUMMARY OF THE INVENTION

The problem on which the invention is based is to provide a control valve of the type initially mentioned, in such a way that it does not need low tolerances and reliably seals off the pressure spaces relative to one another.

This is solved, according to the invention, in that the pressure spaces are sealed off relative to one another in the region of the pressure compensating element.

By virtue of this provide, the control valve according to the invention has a single valve body. The valve body and the pressure compensating element are separated from one another as result of the invention. The control valve according to the invention therefore does not need to have particularly low tolerances. A leak in the control valve according to the invention can consequently be avoided in a simple way. The control valve according to the invention is therefore suitable, in particular, for use in a device for exhaust-gas recirculation in an internal combustion engine of a motor vehicle.

The pressure compensating element could, for example, be a piston displaceable in a cylinder arranged between the pressure spaces. According to another advantageous development of the invention, the pressure compensating element reliably seals off the two pressure spaces relative to one another if the pressure compensating element has a diaphragm for separating the pressure spaces.

According to another advantageous development of the invention, the pressure compensating element has a particularly simple construction if a valve shaft designed for adjusting the valve body is connected to a disk holding the diaphragm.

According to another advantageous development of the invention, disturbances of the pressure compensating element which are generated by flows within the pressure spaces can reliably be avoided if the pressure compensating element subdivides a container into two chambers, and if the first chamber is connected to the first pressure space and the second chamber to the second pressure space.

The control valve according to the invention has a particularly compact formation if the container is arranged on that side of the first pressure space which is located opposite the second pressure space, and if a pressure compensating duct connects the second pressure space to the second chamber.

When the control valve according to the invention is in the basic position, particularly reliable sealing off of the pressure spaces can be ensured in a simple way if the valve body is capable of being returned into the closing position by means of a spring element. The spring element may be manufactured, for example, from spring steel. Since the spring element has to transmit only very low return forces, it may also consist of a metal memory alloy.

According to another advantageous development of the invention, an equilibrium of the forces acting on the valve body and on the pressure compensating element can be established in a simple way if a lever is arranged between the valve body and the pressure compensating element.

BRIEF DESCRIPTION OF THE DRAWINGS

The invention permits numerous embodiments. In order to make its basic principle even clearer, three, of these are illustrated in the figures of the drawings described below. In the drawings

| FIG. 1 | shows a sectional illustration through a first embodiment of a control valve according to the invention in longitudinal section, |
| --- | --- |
| FIG. 2 | shows a further embodiment of the control valve according to the invention in longitudinal section and |
| FIG. 3 | shows a diagrammatic illustration of a further embodiment of the control valve according to the invention. |

DETAILED DESCRIPTION OF THE PREFERRED EMBODIMENT

Figure 1:
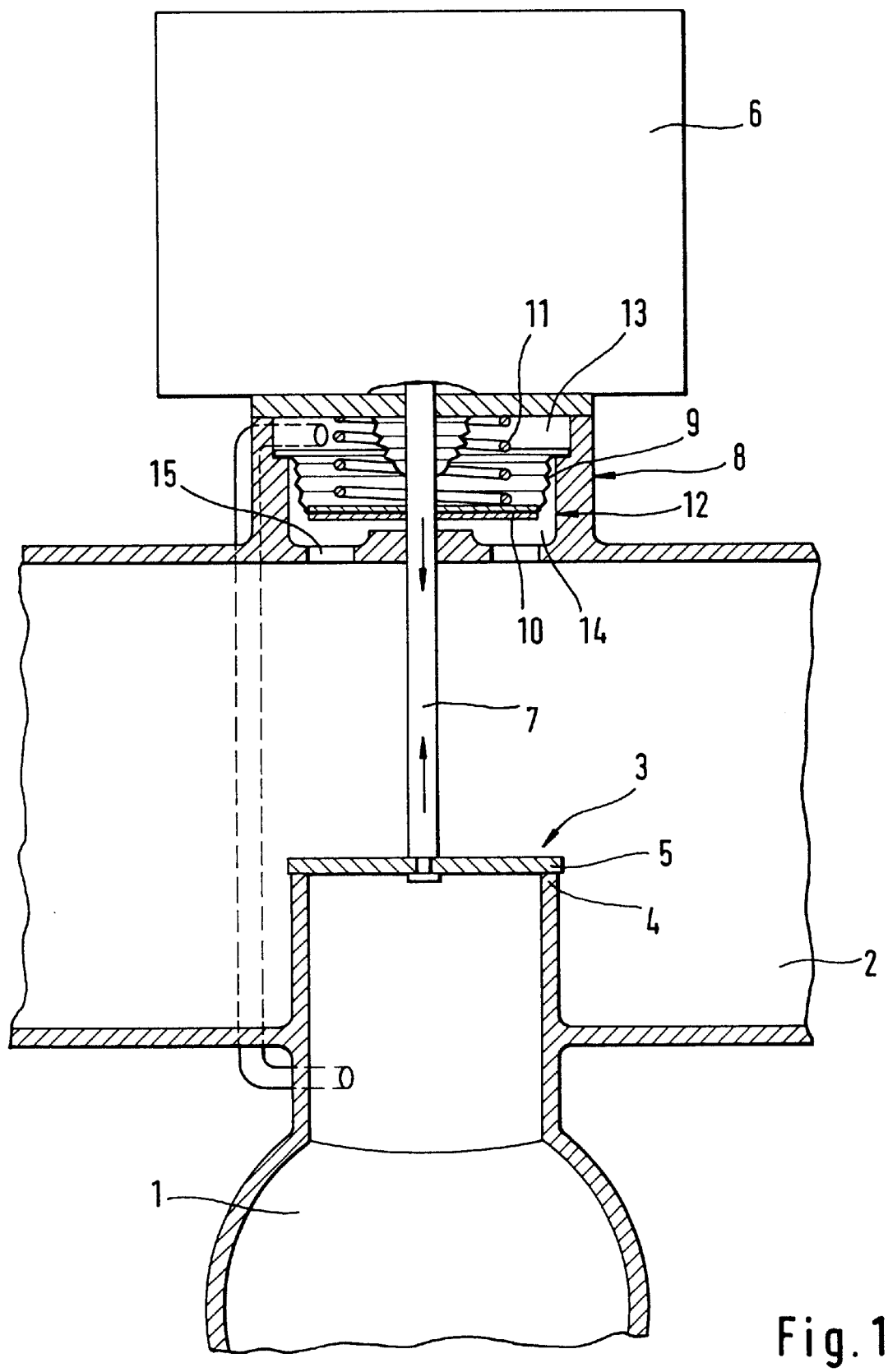

FIG. 1 shows in longitudinal section a device for exhaust-gas recirculation in an internal combustion engine of a motor vehicle, with a first pressure space 1 taking the form of the exhaust duct and with a second pressure space 2 taking the form of the intake duct. A control valve 3 allows an overflow of exhaust gas from the first pressure space 1 into the second pressure space 2. The control valve 3 has a valve body 5 bearing on a valve seat 4 and a control device 6 for moving the valve body 5 perpendicularly to the valve seat 4. The valve body 5 is connected to the control device 6 via a valve shaft 7. The control device 6 can adjust the valve shaft 7, for example by means of an electromagnet which is not illustrated. Consequently, for example depending on the rotational speed of the internal combustion engine, on the load state or on the temperatures, a connection of the pressure space 1 taking the form of the exhaust duct to the pressure space 2 taking the form of the intake duct can be made and exhaust gas can be mixed with fresh air.

A pressure compensating element 8 with a disk 10 holding a diaphragm (bellows) 9 is fastened to the valve shaft 7. The disk 10 is prestressed downward by a spring element 11 formed as a helical spring. The diaphragm 9 is arranged in a container 12 and subdivides the latter into two chambers 13, 14. The diaphragm 9 allows movement of the disk 10 and consequently of the valve shaft 7 and separates the media flowing in the pressure spaces 1, 2. The first chamber 13 is connected to the first pressure space 1, via a pressure compensating duct 15, and the second chamber 14 is connected to the second pressure space 2. The pressure compensating element 8 has essentially the same cross-sectional area as the valve body 5, so that a pressure difference between the chambers 13, 14 and consequently between the pressure spaces 1, 2 introduces, via the pressure compensating element 8, the same forces into the valve shaft 7 as the valve body 5. In this case, the forces point in opposite directions and therefore cancel one another out. For the sake of clarity, the forces acting on the valve body 5 and on the disk 10 are identified by arrows in the drawing for the situation where a lower pressure prevails in the first pressure space 1 than in the second pressure space 2. The spring element 11 serves as a return element for holding the valve body 5 on the valve seat 4 when the control device 6 is under no force. Since the forces acting on the valve body 5 due to the pressure difference between the pressure spaces are compensated by the pressure compensating element 8, the spring element 11 can have a low spring force and a particularly flat spring characteristic.

Figure 2:
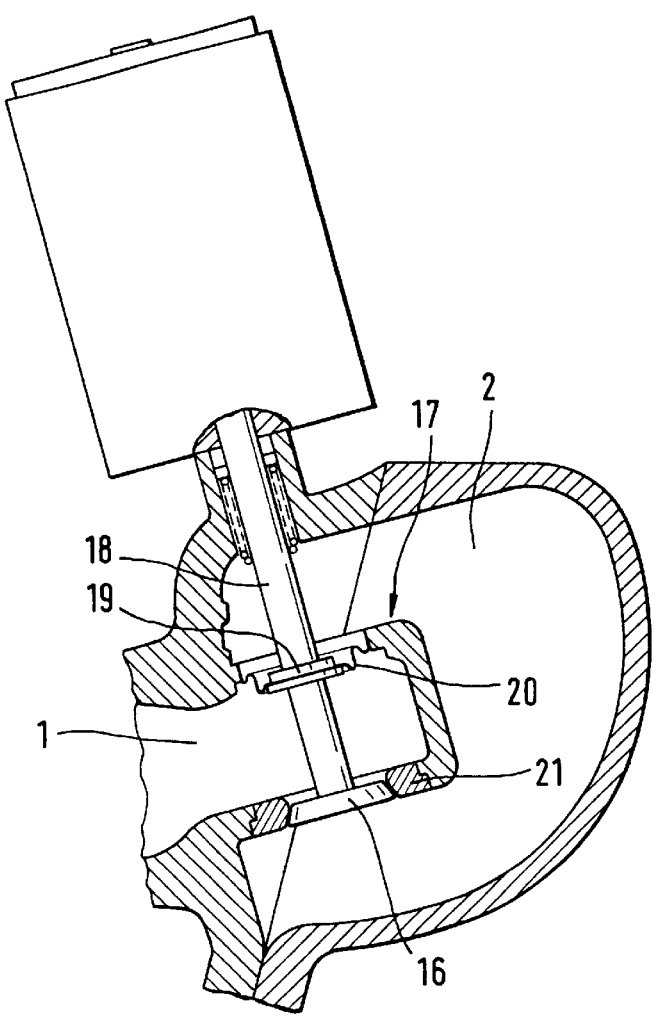

FIG. 2 shows a further embodiment of the control valve. Here, a part region of the first pressure space 1 is surrounded by a second pressure space 2 having a C-shaped cross section. A valve body 16 and a pressure compensating element 17 are arranged in the legs of the second pressure space 2. The pressure compensating element 17 has a disk 19 fastened to a valve shaft 18 and a diaphragm 20 fastened to the disk 19. The valve body 16 is likewise fastened to the valve shaft 18 and, in the position depicted, bears on a valve seat 21. When the valve body 16 is in this position, the media flowing in the pressure spaces 1, 2 are separated from one another. As in the case of the control valve from FIG. 1, forces acting on the valve shaft 18 and generated due to a pressure difference in the pressure spaces 1, 2 cancel one another out.

Figure 3:
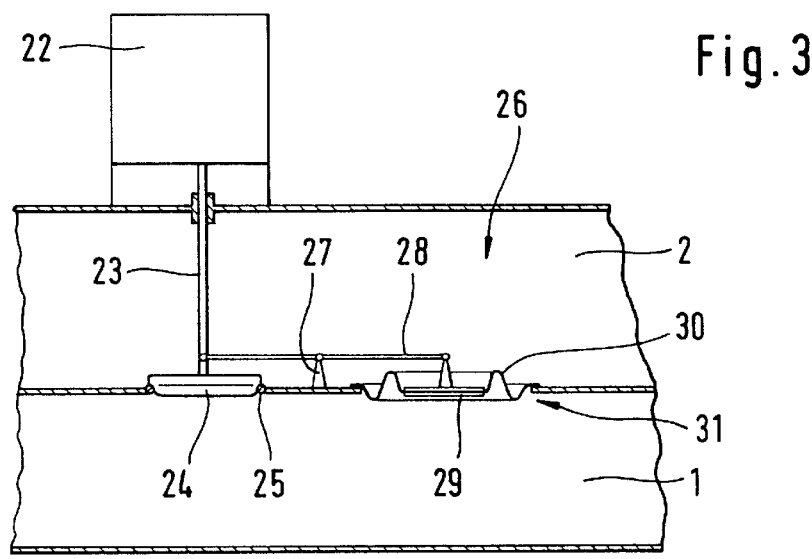

FIG. 3 shows diagrammatically a further embodiment of the control valve. Here, the pressure spaces 1, 2 take the form of ducts arranged parallel to one another. The control valve has a valve shaft 23 displaceable by a control device 22 and a valve body 24 fastened on the valve shaft 23. In the position depicted, the valve body 24 is prestressed against a valve seat 25. A lever 28 engages on the valve shaft 23. The lever 28 is mounted pivotably about a fixed bearing 27 and connects the valve shaft 23 to a pressure compensating element 26. The pressure compensating element 26 has a disk 29 which is articulated on the lever 28 and which is held in an orifice 31 by means of a diaphragm 30. The diaphragm 30 seals off the orifice 31 relative to the disk 29.

I claim:

1. A control valve for a motor vehicle for controlling an overflow of an exhaust-gas from an exhaust duct into an intake duct having a pressure differing from a pressure in the exhaust duct comprising a valve body prestressed against a valve seat, a control device for moving the valve body, and a movable pressure compensating element which is subjected to pressure difference between the ducts and is connected to the valve body, said pressure compensating element has essentially the same cross-sectional area as the valve body and said pressure compensating element equalizing pressure between the ducts thereby compensating for the pressure forces acting on the valve body, wherein the ducts (1, 2) are sealed off relative to one another in a region of the pressure compensating element (8, 17, 26) and whereby the valve body can be raised with minimal force by the control device, wherein a part of the exhaust duct is surrounded by the intake duct having a C-shaped cross section, the valve body and the pressure compensating element each of which is arranged in one of the legs of the intake duct, the pressure compensating element (17) has a disc (19) fastened to valve shaft (18) and a diaphragm (20) fastened to the disc (19), the valve body (16) fastened to the valve shaft (18) and prestressed against the valve seat (21).

2. The control valve as claimed in claim 1, wherein said pressure compensating element (8, 17, 26) has said diaphragm (9, 20, 30) for separating the ducts (1, 2).

3. The control valve as claimed in claim 2, wherein said valve shaft (7, 18, 23) for adjusting the valve body (5, 16, 24) is connected to said disk (10, 19, 29) holding the diaphragm (9, 20, 30).

4. The control valve as claimed in claim 1, further comprising a container, wherein the pressure compensating element subdivides said container (12) into first and second chambers (13, 14), said first chamber (13) is connected to the exhaust duct (1) and said second chamber (14) is connected to the intake duct (2).

5. The control valve as claimed in claim 4, wherein the container (12) is positioned on a side of the exhaust duct (1) opposite the intake duct (2), and a pressure compensating duct (15) connects the intake duct (2) to the second chamber (14).

6. The control valve as claimed in claim 1, wherein the valve body (5) is returnable into a closing position by a spring element (11).

7. The control valve as claimed in claim 1, wherein the exhaust duct is parallel to the intake duct.

* * * * *